(12) United States Patent
Liang et al.

(10) Patent No.: US 9,992,713 B2
(45) Date of Patent: Jun. 5, 2018

(54) METHOD FOR DETERMINING ACCESS CONTROL

(71) Applicant: Samsung Electronics Co., Ltd., Gyeonggi-do (KR)

(72) Inventors: Huarui Liang, Beijing (CN); Hong Wang, Beijing (CN); Lixiang Xu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 14/411,862

(22) PCT Filed: Jun. 27, 2013

(86) PCT No.: PCT/KR2013/005700
§ 371 (c)(1),
(2) Date: Dec. 29, 2014

(87) PCT Pub. No.: WO2014/003455
PCT Pub. Date: Jan. 3, 2014

(65) Prior Publication Data
US 2015/0146690 A1    May 28, 2015

(30) Foreign Application Priority Data
Jun. 29, 2012    (CN) .......................... 2012 1 0226993

(51) Int. Cl.
*H04W 36/00* (2009.01)
*H04W 36/12* (2009.01)
*H04W 8/08* (2009.01)

(52) U.S. Cl.
CPC ....... *H04W 36/0077* (2013.01); *H04W 36/12* (2013.01); *H04W 8/082* (2013.01)

(58) Field of Classification Search
CPC . H04W 36/0077; H04W 36/12; H04W 8/082; H04W 36/00; H04W 36/0005;
(Continued)

(56) References Cited

U.S. PATENT DOCUMENTS 6,925,074 B1    8/2005  Vikberg et al.
8,755,312 B2 *  6/2014  Liang ................ H04W 36/0055
                                                       370/310
(Continued)

FOREIGN PATENT DOCUMENTS

CN        1756412 A     4/2006
CN     101060692 A    10/2007
(Continued)

OTHER PUBLICATIONS

International Search Report dated Sep. 30, 2013 in connection with International Patent Application No. PCT/KR2013/005700, 3 pages.
(Continued)

*Primary Examiner* — Robert Lopata

(57) ABSTRACT

Examples of the present disclosure provide a method for determining access control, applied in a handoff procedure of a UE. The method includes: if a current service is a LIPA@LN service, and if the UE is in a same local network before and after the handoff, keeping, by a node performing access control determination, service continuity of the LIPA@LN service; if the UE moves out of the local network after the handoff, deactivating, by the node performing the access control determination, the LIPA@LN service; if the current service is a SIPTO@LN only service or a SIPTO@CN@LN service, if the UE is in the same local network before and after the handoff, keeping, by the node performing the access control determination, the service continuity of the SIPTO@LN only service or the SIPTO@CN@LN service; if the UE moves out of the local network after the handoff, determining, by the node per-
(Continued)

forming the access control determination, whether to keep the service continuity of the SIPTO@LN only service or the SIPTO@CN@LN service according to a network policy. According to the technical solution provided by the present disclosure, service continuity of the LIPA service or the SIPTO service can be maintained correctly.

14 Claims, 9 Drawing Sheets

(58) Field of Classification Search
CPC ........... H04W 36/0016; H04B 7/18541; H04L 47/767
USPC .......................................... 370/331
See application file for complete search history.

(56) References Cited

U.S. PATENT DOCUMENTS

| | | | |
|---|---|---|---|
| 9,237,487 B2* | 1/2016 | Adachi | H04W 36/08 |
| 9,363,726 B2* | 6/2016 | Adachi | H04W 36/08 |
| 2011/0045834 A1 | 2/2011 | Kim et al. | |
| 2011/0171953 A1 | 7/2011 | Faccin et al. | |
| 2011/0274087 A1* | 11/2011 | Liang | H04W 76/064 370/331 |
| 2012/0076121 A1 | 3/2012 | Choi et al. | |
| 2012/0177005 A1* | 7/2012 | Liang | H04W 8/02 370/331 |
| 2012/0182940 A1* | 7/2012 | Taleb | H04L 29/12066 370/328 |
| 2012/0257598 A1* | 10/2012 | Karampatsis | H04W 8/082 370/331 |
| 2012/0258767 A1* | 10/2012 | Liang | H04W 76/02 455/525 |
| 2012/0314688 A1* | 12/2012 | Taleb | H04W 36/08 370/331 |
| 2013/0003697 A1* | 1/2013 | Adjakple | H04W 36/0011 370/331 |
| 2013/0003698 A1* | 1/2013 | Olvera-Hernandez | H04W 8/082 370/331 |
| 2013/0003699 A1* | 1/2013 | Liu | H04W 8/082 370/331 |
| 2013/0010754 A1* | 1/2013 | Xu | H04W 76/06 370/331 |
| 2013/0010756 A1* | 1/2013 | Liang | H04W 36/18 370/331 |
| 2013/0272268 A1* | 10/2013 | Xu | H04W 76/066 370/331 |
| 2013/0287012 A1* | 10/2013 | Pragada | H04W 76/045 370/338 |
| 2013/0308527 A1* | 11/2013 | Chin | H04W 36/0022 370/328 |
| 2014/0003241 A1* | 1/2014 | Kim | H04W 36/22 370/235 |
| 2014/0177590 A1* | 6/2014 | Sirotkin | H04W 52/0225 370/331 |
| 2014/0301364 A1* | 10/2014 | Xu | H04W 36/12 370/331 |
| 2014/0376512 A1* | 12/2014 | Jeong | H04W 76/06 370/331 |

FOREIGN PATENT DOCUMENTS

| | | | |
|---|---|---|---|
| CN | 101730187 A | 6/2010 | |
| CN | 102026409 A | 4/2011 | |
| WO | WO 2013044668 A1 * | 4/2013 | ............ H04W 8/082 |

OTHER PUBLICATIONS

Written Opinion of International Searching Authority dated Sep. 30, 2013 in connection with International Patent Application No. PCT/KR2013/005700, 4 pages.
Extended European Search Report dated Jan. 22, 2016 in connection with European Application No. 13809813.2, 12 pages.
Samsung, "LIPA Mobility Key Issue", SA WG2 Meeting #85, S2-112382, May 16-20, 2011, Xi'An, P.R. China, 3 pages.
Catt, "Discussion of LGW Deployment in Local Network", 3GPP TSG SA WG2 Meeting #84, TD S2-111814, Apr. 11-15, 2011, Bratislava, Slovakia, 3 pages.
NEC, "Architectural Requirements for SIPTO for the Local Network", 3GPP TSG SA WG2 Meeting #83, Feb. 21-25, 2011, Salt Lake City, Utah, 5 pages.
3GPP, "3rd Generation Partnership Project; Technical Specification Group Services and System Aspects; LIPA Mobility and SIPTO at the Local Network (Release 12)", TR 23.859 V.0.5.0 (May 2012), Valbonne, France, 55 pages.
Communication from a foreign patent office in a counterpart foreign application, State Intellectual Property Office of P.R. China, "The Notification of the First Office Action," Application No. CN 201210226993.5, Sep. 26, 2017, 16 pages.

* cited by examiner

[Fig. 1]
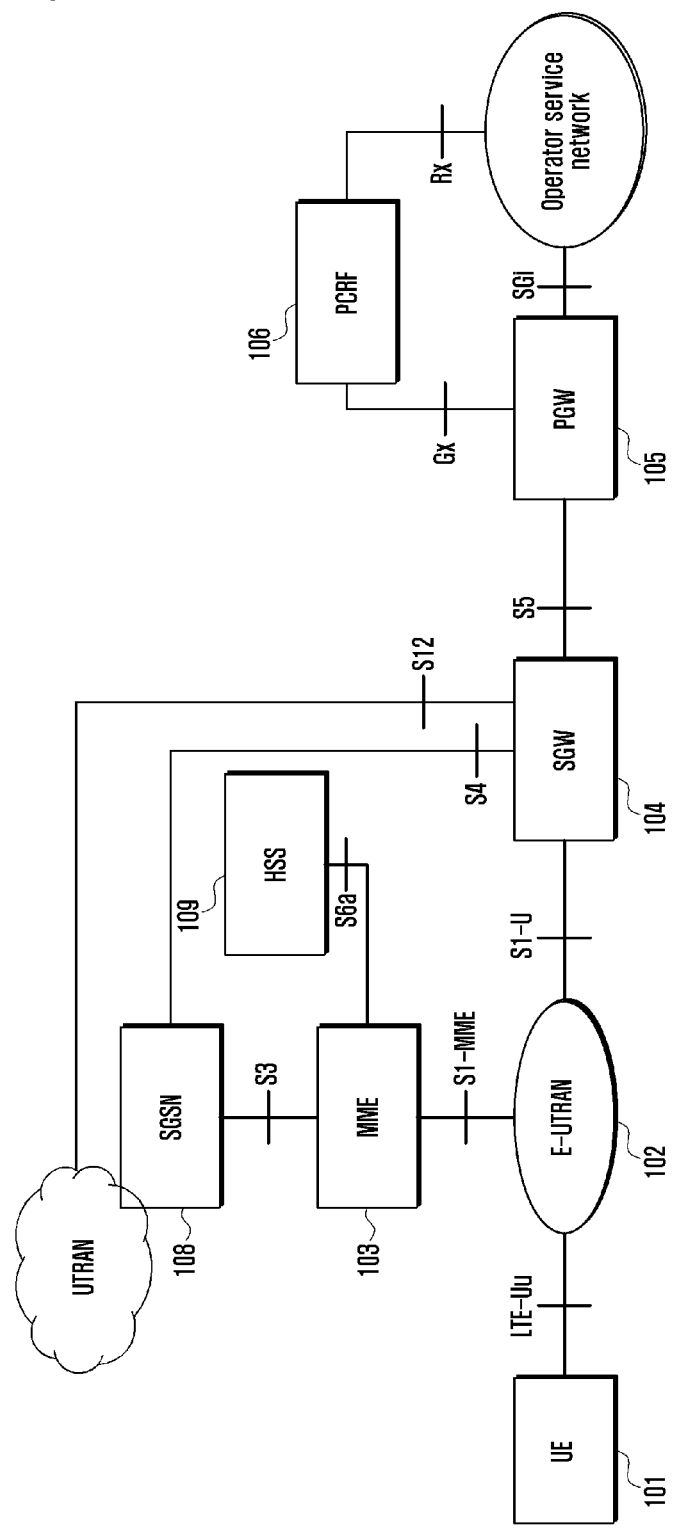

[Fig. 2]
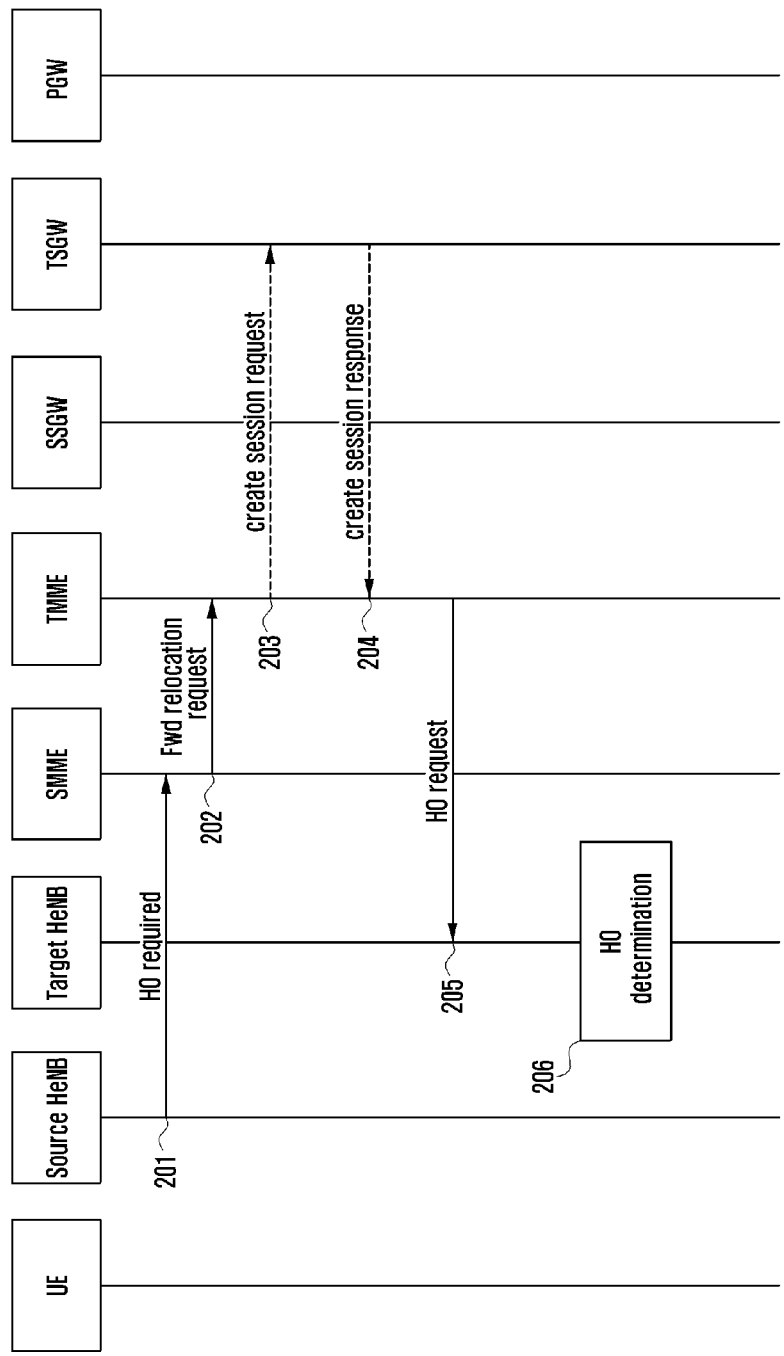

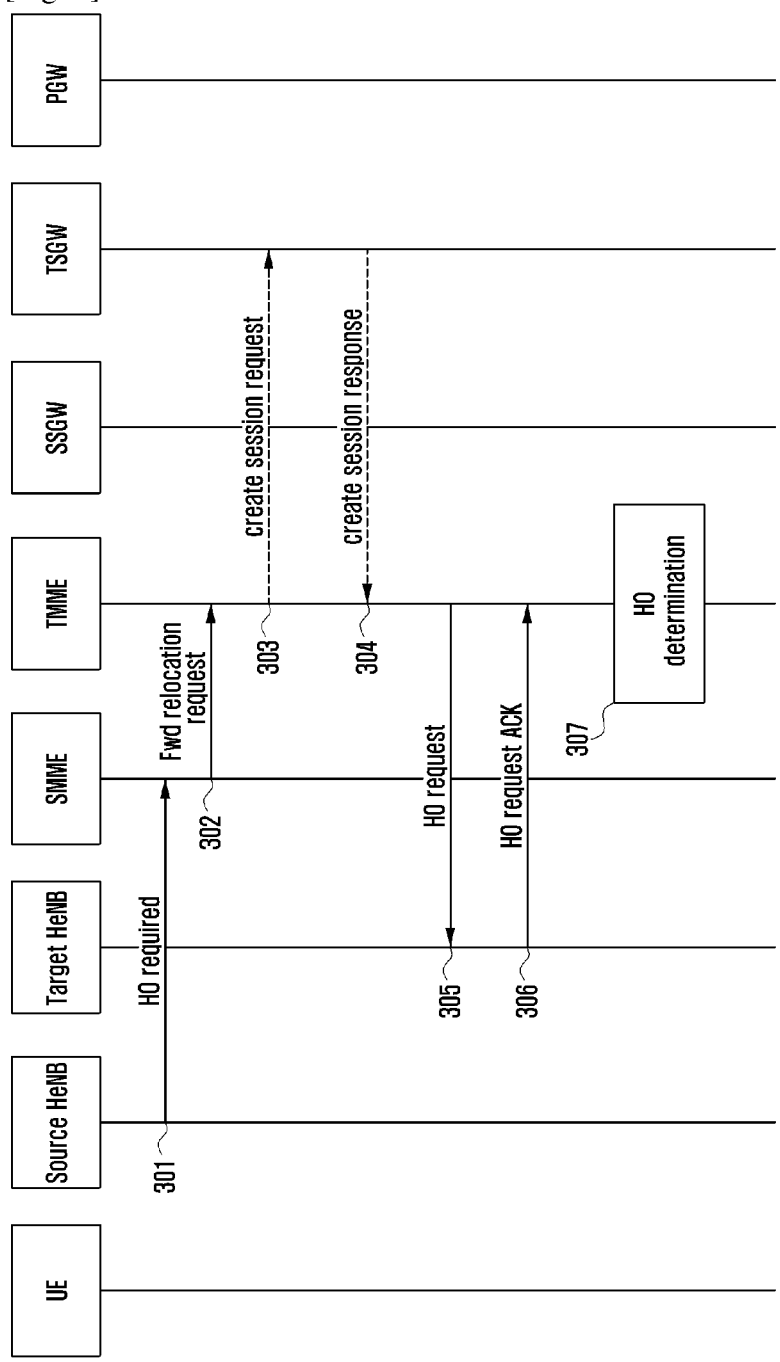
[Fig. 3]

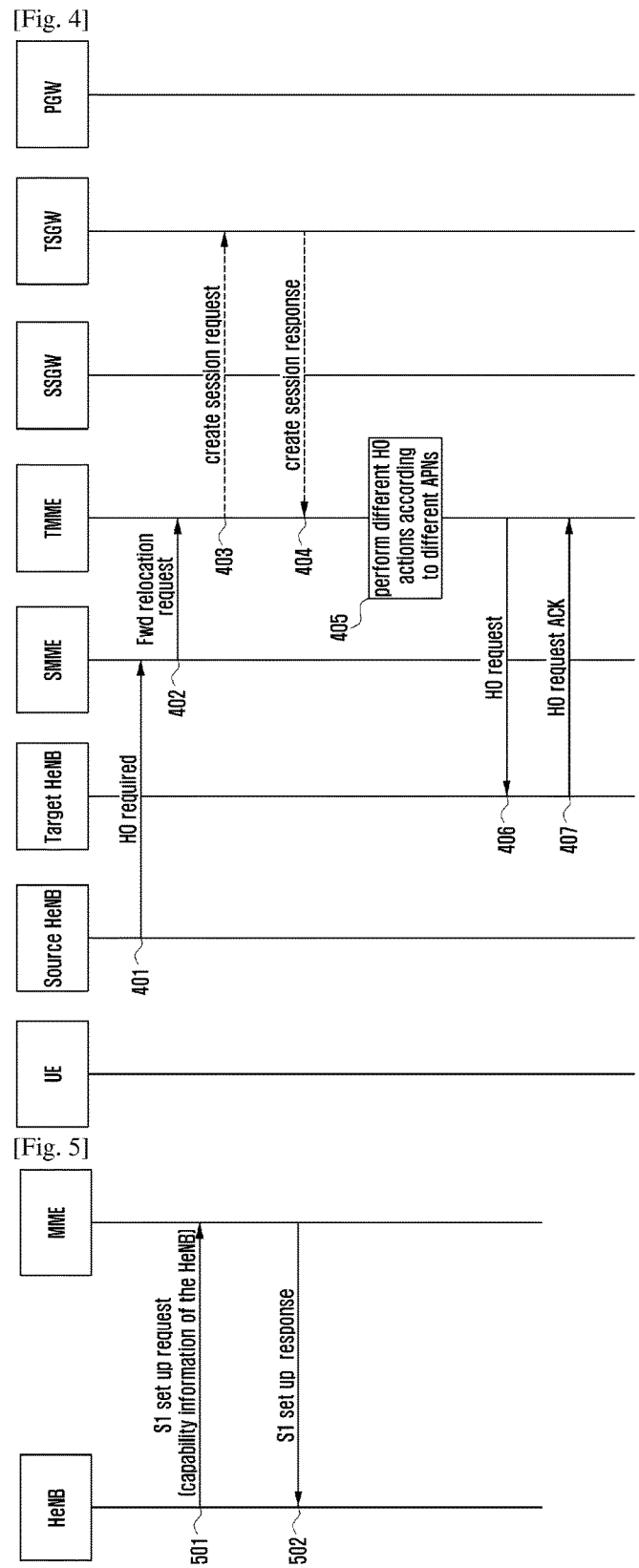

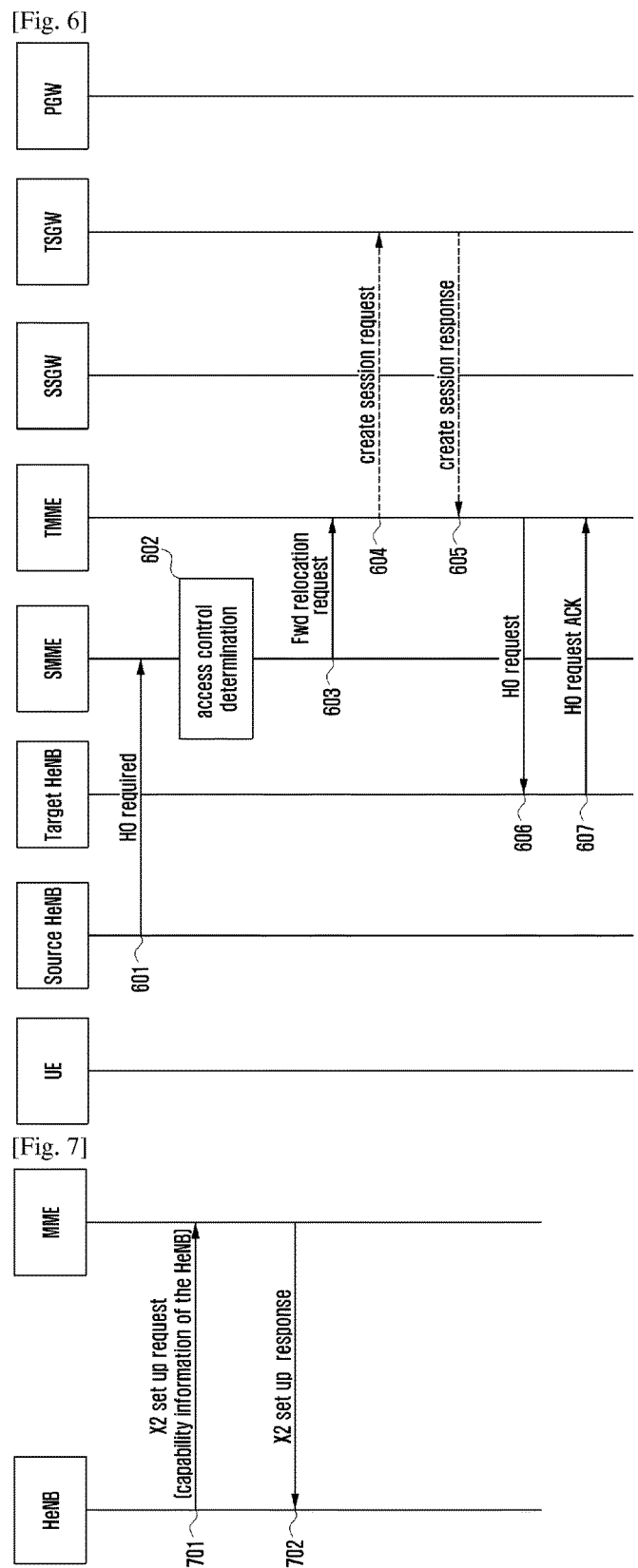

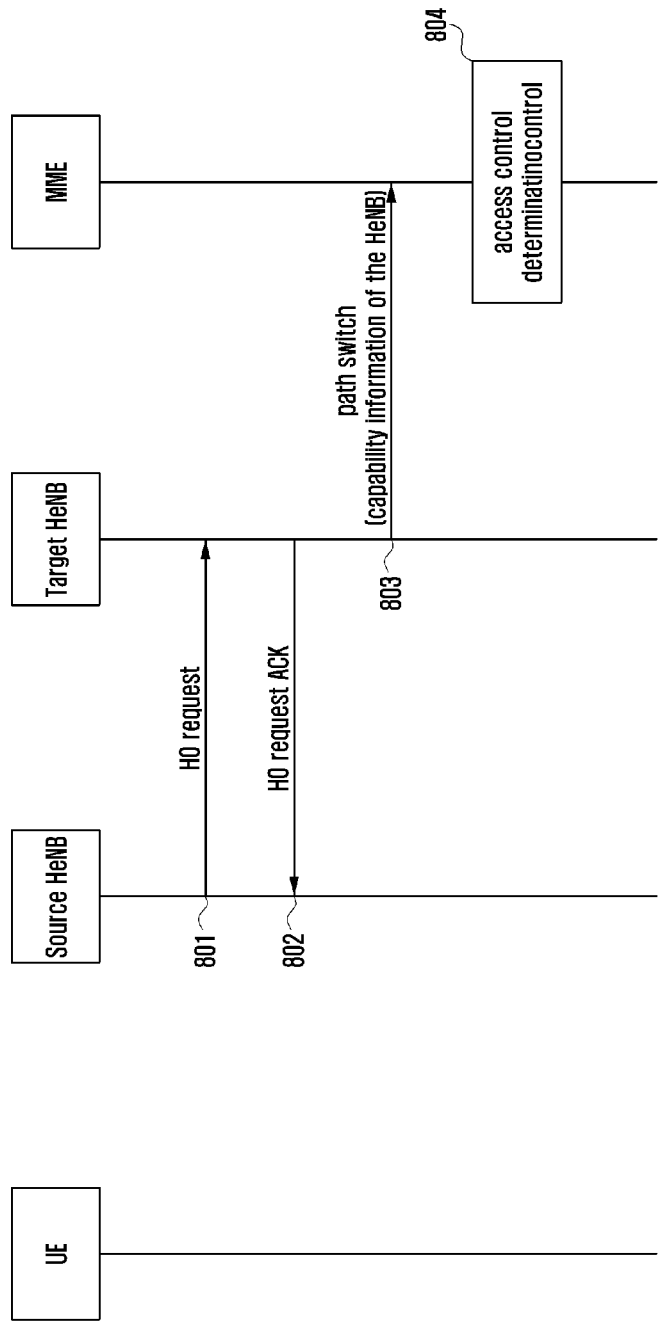
[Fig. 8]

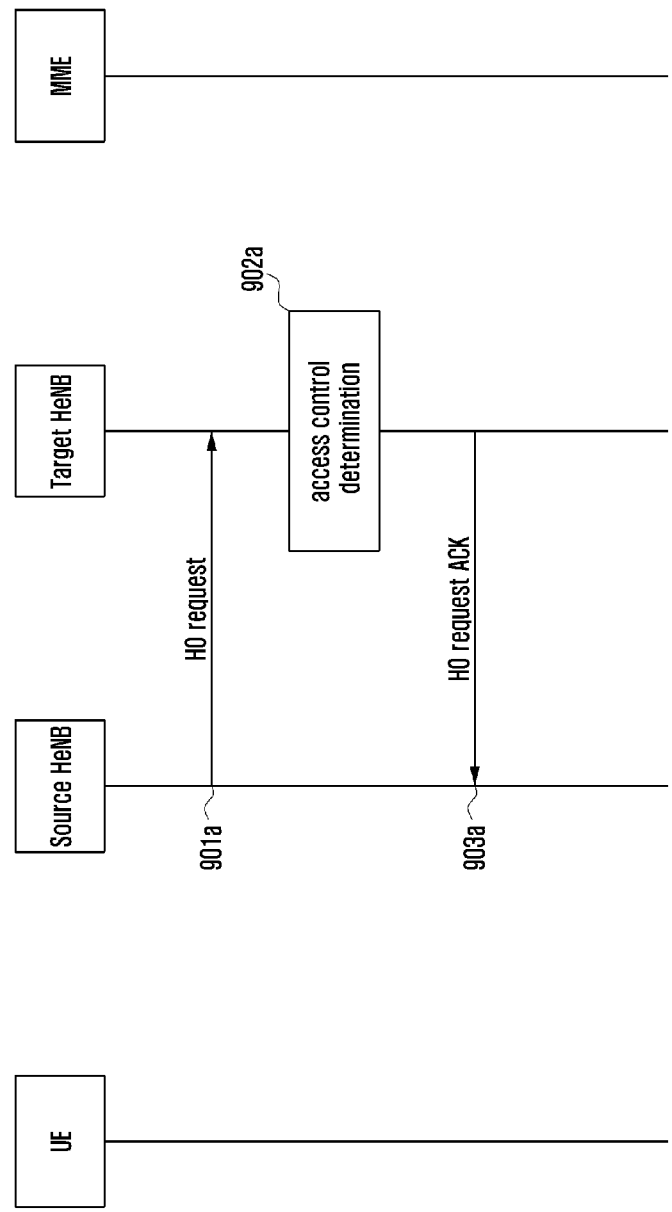
[Fig. 9a]

[Fig. 9b]
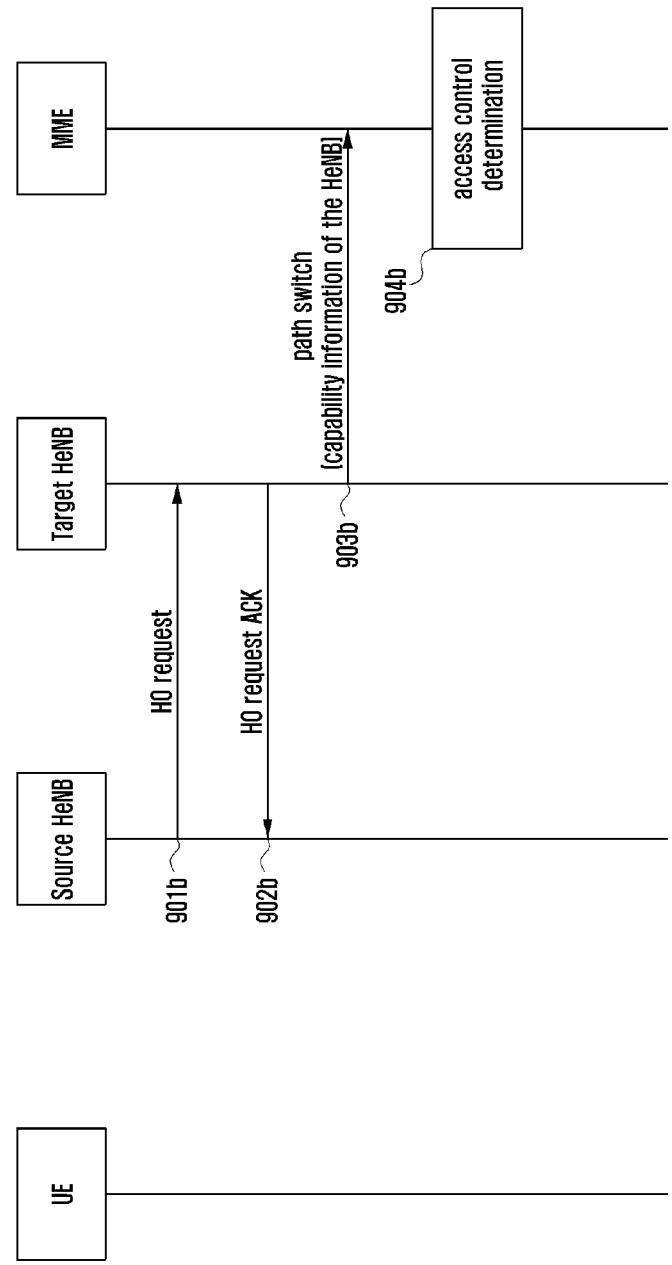

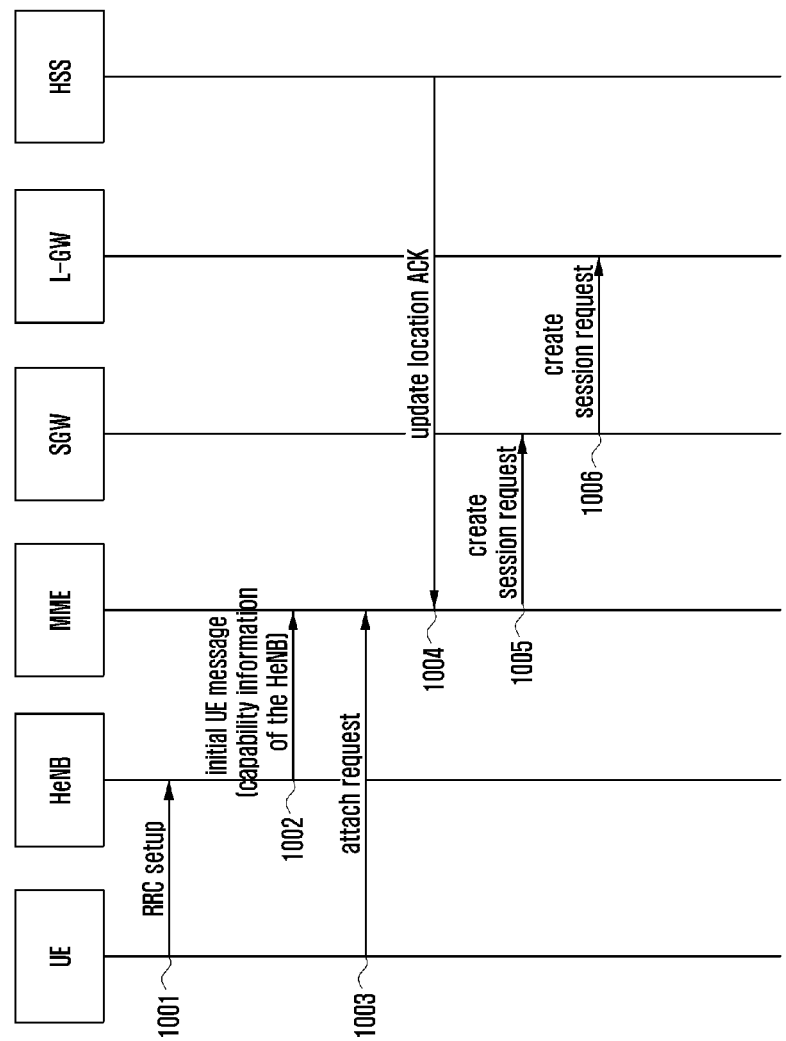

METHOD FOR DETERMINING ACCESS CONTROL

CROSS-REFERENCE TO RELATED APPLICATION(S)

The present application claims priority under 35 U.S.C. § 365 to International Patent Application No. PCT/KR2013/005700 filed Jun. 27, 2013, entitled "METHOD FOR DETERMINING ACCESS CONTROL". International Patent Application No. PCT/KR2013/005700 claims priority under 35 U.S.C. § 365 and/or 35 U.S.C. § 119(a) to Chinese Patent Application No. 201210226993.5 filed Jun. 29, 2012, which are incorporated herein by reference into the present disclosure as if fully set forth herein.

TECHNICAL FIELD

The present disclosure relates to radio communication techniques, and more particularly, to a method for determining access control.

BACKGROUND ART

FIG. 1 shows a structure of System Architecture Evolution (SAE). User Equipment (UE) 101 is a terminal device used for receiving data. Evolved Universal Terrestrial Radio Access Network (E-UTRAN) 102 is a radio access network including eNodeB (eNB) which provides a radio network interface for the UE. Mobility Management Entity (MME) 103 is responsible for managing mobile context, session context and security information of the UE. Serving Gateway (SGW) 104 mainly provides user plane functions. MME 103 and SGW 104 may be located in the same physical entity. Packet data Gateway (PGW) 105 is responsible for functions such as charging and legal listening. PGW 105 may be located in the same physical entity with SGW 104. Policy and Charging Rule Function (PCRF) 106 provides Quality of Service (QoS) policies and charging rules. Serving GPRS Support Node (SGSN) 108 is a network node device providing routes for data transmissions in Universal Mobile Telecommunications System (UMTS). Home Subscriber Server (HSS) 109 is a home subscriber subsystem of the UE and is responsible for saving user information such as current position of the UE, address of the serving node, user security information and packet data context of the UE.

With the increasing of the service data rate of the UE, supporting of Selected IP Traffic Offload (SIPTO) and Local IP Access (LIPA) capabilities is proposed in 3GPP. In the SIPTO, when the UE access the Internet or other external networks via a Home Evolved NodeB (HeNB), a Home NodeB (HNB) or an eNodeB/NodeB, the network may select or re-select a user plane node which is closer to the radio access network. When the UE access a home network or an enterprise network via the HeNB or the HNB, a user plane node closer to the HNB or a user plane node in the HeNB/HNB access network may be selected or re-selected for the UE during the LIPA. The user plane node may be a core network device or a gateway. For the SAE system, the user plane node may be the SGW or PGW or LGW. For the UMTS system, the user plane node may be the SGSN or GGSN.

At present, there are two kinds of service scenarios in the standards, one is LIPA service supporting local network, and the other is SIPTO service supporting local network. For the two kinds of services, the same network architecture or different network architectures may be used. Differences between the two kinds of services include the following.

The LIPA service supporting local network only allows a Closed Subscriber Group (CSG) member to activate the LIPA service. When the user moves within the local network, service continuity of the user is maintained. When the user moves out of the local network, the LIPA service is broken.

The SIPTO service supporting local network allows both the CSG member and a non-CSG member (e.g., a user accesses via hybrid HeNB) to activate the SIPTO service. When the user moves within the local network, service continuity of the UE is maintained. When the user moves out of the local network, a service type that the user requested and an operator's policy are utilized to determine whether the service should be broken. For example, if an identifier corresponding to an APN of the current service indicates that the service is supported only by the local network, the service will be broken and not re-established when the user moves out of the local network. if the identifier corresponding to the APN of the current service indicates that the SIPTO service may be activated under a base station outside or inside the local network and if the operator's policy is keeping the continuity of the service after the UE moves out of the local network supporting the SIPTO service, the continuity of the current service of the UE is maintained after the UE moves out of the local network, and the network may re-activate the SIPTO service for the UE later and re-select a new user plane node device for the UE.

DISCLOSURE OF INVENTION

Technical Problem

However, as to the problem that how does the network determine whether to activate the LIPA service or the SIPTO service supported by the local network, and whether service continuity of the LIPA service or the SIPTO service is maintained and whether a universal solution can be adopted when the UE moves to another NodeB in the case that UE has activated the LIPA/SIPTO service supported by the local network, there is no corresponding solution yet. Therefore, it is impossible to correctly determine whether service continuity of the LIPA service or the SIPTO service should be maintained.

Solution to Problem

Examples of the present disclosure provide a method for determining access control, so as to correctly maintain service continuity of a LIPA service or a SIPTO service during handoff of a UE.

According to an example of the present disclosure, a method for determining access control is provided. The method is applied in the handoff procedure of the UE. The method includes:

if a current service is a LIPA@LN service, and if the UE is in a same local network before and after the handoff, keeping, by a node performing access control determination, service continuity of the LIPA@LN service; if the UE moves out of the local network after the handoff, deactivating, by the node performing the access control determination, the LIPA@LN service;

if the current service is a SIPTO@LN only service or a SIPTO@CN@LN service, if the UE is in the same local network before and after the handoff, keeping, by the node performing the access control determination, the service continuity of the SIPTO@LN only service or the SIPTO@CN@LN service; if the UE moves out of the local network after the handoff, determining, by the node performing the access control determination, whether to keep the service continuity of the SIPTO@LN only service or the SIPTO@CN@LN service according to a network policy.

The method may further include:

if the network policy indicates to keep the service continuity of the SIPTO@LN only service or the SIPTO@CN@LN service, determining, by the node performing the access control determination, whether there is a connection between a target NodeB and a Local Gateway (LGW) connected with a source NodeB, if there is a connection, keeping the service continuity of the SIPTO@LN only service or the SIPTO@CN@LN service; otherwise, deactivating the SIPTO@LN only service or the SIPTO@CN@LN service.

Preferably, if an identifier of a local network where the source NodeB is located is the same with an identifier of a local network of the target NodeB, or if an IP address of the LGW connected with the source NodeB is the same with an IP address of an LGW connected with the target NodeB, determining that the UE is in the same local network before and after the handoff; otherwise, determining that the UE moves out of the local network after the handoff;

or, if an identifier of a local network where the source NodeB is located is the same with an identifier of a local network of the target NodeB, determining that the UE is in the same local network before and after the handoff; otherwise, determining that the UE moves out of the local network after the handoff.

Preferably, the node performing the access control determination is the target NodeB during an S1 handoff;

before the access control determination is performed, the method may further include:

transmitting, by the source NodeB, a handoff required message to a source Mobility Management Entity (MME);

forwarding, by the source MME, the handoff required message to a target MME, wherein the handoff required message carries the IP address of the LGW connected with the source NodeB and/or the identifier of the local network where the source NodeB is located;

transmitting, by the target MME, a handoff required message to the target NodeB carrying the IP address of the LGW connected with the source NodeB and/or the identifier of the local network where the source NodeB is located and a first indication identifier, wherein the first indication identifier is used for notifying the target NodeB of the type of the current service.

Preferably, the node performing the access control determination is a target MME during an S1 handoff;

before the access control determination is performed, the method may further include:

transmitting, by the source NodeB, a handoff required message to a source MME;

forwarding, by the source MME, the handoff required message to a target MME, wherein the handoff required message carries the IP address of the LGW connected with the source NodeB and/or the identifier of the local network where the source NodeB is located;

requesting, by the target MME, the target NodeB to provide IP addresses of all of the LGWs that the target NodeB can be connected with and/or the identifier of the local network that the target NodeB is located; or receiving, by the target MME, the IP addresses of all of the LGWs that the target NodeB can be connected with and/or the identifier of the local network that the target NodeB is located initiatively transmitted by the target NodeB; or indicating, by the target MME, the IP address of the LGW connected with the source NodeB to the target NodeB, and receiving from the target NodeB information indicating whether there is a connection between the target NodeB and the LGW connected with the source NodeB; or obtaining, by the target MME, IP addresses of all of the LGWs that each NodeB connected with the target MME can be connected with during the S1 setup procedure or a UE initial setup procedure.

Preferably, before the access control determination is performed, the method may further include:

transmitting, by the source NodeB, a handoff required message to a source MME;

forwarding, by the source MME, the handoff required message to a target MME, wherein the handoff required message carries the IP address of the LGW connected with the source NodeB and/or the identifier of the local network where the source NodeB is located;

determining, by the target MME during the S1 handoff procedure, the type of the current service;

if the current service is the LIPA@LN service, before determining whether the UE is located in the same local network before and after the handoff, the method may further include: transmitting, by the target MME, a handoff required message carrying the IP address of the LGW connected with the source NodeB and/or the identifier of the local network where the source NodeB is located to the target NodeB, and performing, by the target NodeB during the S1 handoff procedure, subsequent operations acting as the node performing the access control determination;

if the current service is the SIPTO@LN only service or the SIPTO@CN@LN service, performing, by the target MME during the S1 handoff procedure, subsequent operations acting as the node performing the access control determination, the method may further include: requesting, by the target MME, the target NodeB to provide the IP addresses of all of the LGWs that the target NodeB can be connected with and/or the identifier of the local network where the target NodeB is located; or receiving, by the target MME, the IP addresses of all of the LGWs that the target NodeB can be connected with and/or the identifier of the local network that the target NodeB is located initiatively transmitted by the target NodeB; or indicating, by the target MME, the IP address of the LGW connected with the source NodeB to the target NodeB, and receiving from the target NodeB information indicating whether there is a connection between the target NodeB and the LGW connected with the source NodeB; or obtaining, by the target MME, IP addresses of all of the LGWs that each NodeB connected with the target MME can be connected with during the S1 setup procedure or a UE initial setup procedure.

Preferably, the node performing the access control determination is the source MME during the S1 handoff procedure;

before the access control determination is performed, the method may further include:

obtaining, by the source MME, identities and capability information of all of the NodeBs connected with the source MME during the S1 setup procedure or the UE initial setup procedure, and saving a relationship between the identity and the capability information of each NodeB; wherein the capability information comprises any one or any combination of: type of the service supported by the NodeB, IP addresses or all of the LGWs that the NodeB can be connected with, and the identifier of the local network where the NodeB is located.

Preferably, the node performing the access control determination is the MME during an X2 handoff;

before the access control determination is performed, the method may further include:

obtaining, by the MME, identities and capability information of all of the NodeBs connected with the MME during an S1 setup procedure or a UE initial setup procedure, and saving a relationship between the identity and capability information of each NodeB; wherein the capability information comprises any one or any combination of: type of the service supported by the NodeB, IP addresses or all of the LGWs can be connected with the NodeB, and the identifier of the local network where the NodeB is located;

transmitting, by the target NodeB, a path switch message to the MME, wherein the message contains the capability information of the target NodeB; the capability information comprises any one or any combination of: type of the service supported by the target NodeB, IP addresses or all of the LGWs that the target NodeB can be connected with, and the identifier of the local network where the target NodeB is located.

Preferably, the source NodeB during an X2 handoff procedure determines the type of the current service;

if the current service is the LIPA@LN service, before determining whether the UE is in the same local network before and after the handoff, the method may further include: transmitting, by the source NodeB, a handoff required message to the target NodeB, wherein the message contains the capability information of the source NodeB, the capability information comprises any one or any combination of: type of the service supported by the source NodeB, IP address or the LGW connected with the source NodeB, and the identifier of the local network where the source NodeB is located, performing, by the target NodeB during the X2 handoff procedure, subsequent operations acting as the node performing the access control determination;

if the current service is the SIPTO@LN only service or the SIPTO@CN@LN service, before determining whether the UE is in the same local network before and after the handoff, the method may further include: obtaining, by the MME, the identities and capability information of all of the NodeBs connected with the MME via the S1 setup procedure or the UE initial setup procedure, saving a relationship between the identity and the capability information of each NodeB; wherein the capability information comprises any one or any combination of: type of service supported by the NodeB, IP addresses of all of the LGWs can be connected with the NodeB, the identity of the local network where the NodeB is located; after receiving the handoff required message transmitted by the source NodeB, transmitting, by target NodeB, a path switch message to the MME, wherein the path switch message comprises the capability information of the target NodeB, the capability information comprises any one or any combination of: type of the service supported by the target NodeB, IP addresses or all of the LGWs that the target NodeB can be connected with, and the identifier of the local network where the target NodeB is located.

Preferably, before the access control determination is performed, the method may further include:

transmitting, by a first NodeB, an X2 setup request to a second NodeB, wherein the message carries the capability information of the first NodeB, the capability information comprises any one or any combination of: type of service supported by the first NodeB, IP address of the LGW can be connected with the first NodeB, and the identity of the local network where the first NodeB is located;

if the second NodeB supports the same type of service with the first NodeB, or the second NodeB can be connected with an LGW which has the same IP address with an LGW connected with the source NodeB, or the identity of the local network where the second NodeB is located is the same with that of the first NodeB, returning, by the second NodeB, an X2 setup succeed acknowledgement to the first NodeB; otherwise, returning, by the second NodeB, an X2 setup failure response to the first NodeB;

the first NodeB and the second NodeB are the source NodeB and target NodeB during the handoff procedure.

Advantageous Effects of Invention

It can be seen from the above solution that, in the access control determination method provided by the examples of the present disclosure, through determining the type of the current service and whether the UE is in the same local network before and after the handoff, it can be determined, in combination of the network policy, whether the service continuity of the SIPTO service should be maintained. Thus, it is able to correctly determine under which situations the deactivation of the LIPA service or the SIPTO service should be performed, and determine under which situations the continuity of the LIPA or SIPTO service should be maintained, so as to correctly maintain the continuity of the LIPA service or the SIPTO service.

BRIEF DESCRIPTION OF DRAWINGS

FIG. 1 is a schematic diagram illustrating a system architecture of SAE according to the prior art.

FIG. 2 is a schematic diagram illustrating an S1 handoff according to a first example of the present disclosure.

FIG. 3 is a schematic diagram illustrating an S1 handoff according to a second example of the present disclosure.

FIG. 4 is a schematic diagram illustrating an S1 handoff according to a third example of the present disclosure.

FIG. 5 is a schematic diagram illustrating setup of an S1 connection according to a fourth example of the present disclosure.

FIG. 6 is a schematic diagram illustrating an S1 handoff according to a fifth example of the present disclosure.

FIG. 7 is a schematic diagram illustrating setup of an X2 connection according to a sixth example of the present disclosure.

FIG. 8 is a schematic diagram illustrating an X2 handoff according to a seventh example of the present disclosure.

FIG. 9a is a schematic diagram illustrating an X2 handoff according to an eighth example of the present disclosure.

FIG. 9b is a schematic diagram illustrating another X2 handoff according to the eighth example of the present disclosure.

FIG. 10 is a schematic diagram illustrating an initial network attach procedure of the UE according to a ninth example of the present disclosure.

MODE FOR THE INVENTION

The present disclosure will be described in further detail hereinafter with reference to accompanying drawings and embodiments to make the objective, technical solution and merits therein clearer.

The above described LIPA service supported by the local network is represented by LIPA@LN hereinafter.

For the above described SIPTO service supported by the local network, there are several situations in current standards:

1) The SIPTO service is supported by only the local network. Service continuity of the SIPTO service is maintained only within the local network. After the UE moves out of the local network, whether the service continuity is maintained depends on an operator's policy. This kind of SIPTO service is represented by SIPTO@LN only hereinafter.

2) The SIPTO service can be activated for the UE only under the macro NodeB, represented by SIPTO@CN only hereinafter.

3) The SIPTO service can be activated under either the local network or the macro network, represented by SIPTO@CN@LN hereinafter.

4) SIPTO service is not supported.

The NodeB mentioned in the examples of the present disclosure refers to HeNB or HNB without prejudice.

The following examples are solutions during the handoff of the UE. It is supposed that the NodeB disposed in the local network may be universally used by the LIPA or SIPTO service.

A First Example

In this example, suppose that an S1 handoff happens to the UE, a following manner may be adopted to determine whether service continuity of the LIPA/SIPTO service supported by the local network can be maintained:

Determining the type of the current service according to an identifier corresponding to an APN of the current service;

if it is the LIPA service and the UE moves out of the local network, the network side deactivates the LIPA service;

if it is the SIPTO service and the UE moves out of the local network, determine whether to keep the service continuity according to the operator's policy. Furthermore, if there is no connection between the LGW connected with a source NodeB and a target NodeB, the service is disconnected.

FIG. 2 is a schematic diagram illustrating an S1 handoff according to a first example of the present disclosure. As shown in FIG. 2, source HeNB denotes a source NodeB, Target HeNB denotes a target NodeB, SMME denotes a source MME, TMME denotes a target MME, TSGW denotes a target SGW. Meanings of the abbreviations in FIG. 3 to FIG. 10 are the same with those in FIG. 2 and will not be repeated hereinafter.

The handoff as shown in FIG. 2 includes the following operations.

At block 201, the source NodeB transmits a handoff required message to the SMME.

At block 202, the SMME forwards the handoff required message to the TMME, wherein the handoff required message includes the APN of the current service of the UE, an IP address of the LGW connected with the source NodeB and/or a Local Haul Network (LHN) ID of the local network where the source NodeB is located.

It should be noted that, if it is defined that one NodeB connects with only one LGW, the IP address of each LGW corresponds to one LHN ID uniquely. At this time, it is only required to transmit one of the IP address of the LGW connected with the source NodeB and the LHN ID of the local network where the source NodeB is located. If one NodeB may connect with multiple LGWs, one LHN ID may correspond to IP addresses of multiple LGWs. At this time, both the IP address of the LGW connected with the source NodeB and the LHN ID of the local network where the source NodeB is located need to be transmitted. Therefore, in this example and the following relevant descriptions of the present disclosure, the IP address of the LGW connected with the source NodeB and the LHN ID of the local network where the source NodeB is located are described in a "and/or" manner.

If SGW re-selection happens, blocks 203 and 204 are performed; otherwise, blocks 203 and 204 are omitted.

At block 203, the TMME transmits a create session request message to the TSGW.

At block 204, the TSGW returns a create session response message to the TMME.

At block 205, the TMME transmits a handoff request message to the Target NodeB. The handoff request message includes the IP address of the LGW connected with the source NodeB and/or the LHN ID of the local network where the source NodeB is located, and further includes a first indication identifier. The first indication identifier is used for notifying the target NodeB of the type of the current service. The type of the current service may be LIPA service supported by the local network (LIPA@LN), or SIPTO service supported by the local network (SIPTO@LN only), or SIPTO@CN@LN.

At block 206, the Target NodeB performs an access control determination.

If the current service of the handoff UE is the LIPA@LN service, and if the LHN ID of the local network where the target NodeB is located is the same with that of the source NodeB, it indicates that the Target NodeB and the source NodeB are in the same local network. The handoff may succeed and the service continuity is maintained. Otherwise, it indicates that the UE has moved outside of the local network. The handoff fails and the service is disconnected. In this case, the target NodeB needs to transmit a handoff failure message to the target MME.

If the current service of the handoff UE is the SIPTO@LN only or SIPTO@CN@LN in the SIPTO service, and if the LHN ID of the local network where the target NodeB is located is the same with that of the source NodeB, it indicates that the target NodeB and the source NodeB are located in the same local network, the handoff may succeed and the service continuity is maintained. Otherwise, whether the service continuity is maintained is determined based on the indication or configuration of the network policy. For example, suppose that the network policy indicates that the continuity of the SIPTO service should be maintained to the best capability even if the UE moves out of the local network. Then, the target NodeB needs to determine whether there is connection between itself and the LGW connected with the source NodeB. If there is, the target NodeB returns a handoff request acknowledgement to the target MME later.

It should be noted that, in the above determination it is supposed that one NodeB can be connected with multiple LGWs. Therefore, the determination on whether two NodeBs are in the same local network must be performed based on the LHN IDs of the local networks of the two NodeBs. For the situation that one NodeB is connected with only one LGW, since the IP address of the LGW corresponds to one LHN ID uniquely, it is also possible to determine whether two NodeBs are in the same local network through determining whether the IP addresses of the LGWs connected with the two NodeBs are the same. For simplicity, in the following examples of the present disclosure, the situation that one NodeB can be connected with multiple LGWs is taken as an example. For the situation that one NodeB is connected with only one LGW, the description herein may be referred to.

In this example, suppose that each NodeB knows that it is connected with which LGWs and knows the LHN ID of the local network where the NodeB is located through configurations on the NodeB. Therefore, the target NodeB may determine whether there is a connection between the target NodeB and the LGW connected with the source NodeB or determine whether the target NodeB is located in the same local network with the source NodeB according to the configuration of the target NodeB.

It should be noted that, the LGW connected with the source NodeB refers to one LGW. The LGW that the target NodeB can be connected with refers to all of the LGWs that the target NodeB can be connected with; the number may be one or more.

Second Example

This example is a substitute solution of the first example.

FIG. 3 is a schematic diagram illustrating an S1 handoff according to the second example of the present disclosure. The handoff procedure includes the following operations.

Blocks 301 to 304 are similar to those of blocks 201 to 204 in the first example, and will not be repeated herein.

At block 305, the target MME transmits a handoff request message to the target NodeB. The message carries indication information requiring the target NodeB to provide the IP address of the LGW that the target NodeB can be connected with and/or the LHN ID of the local network that the target NodeB is located. The indication information is optional.

At block 306, the target NodeB provides the IP address of the LGW that the target NodeB can be connected with and/or the LHN ID of the local network that the target NodeB is located to the target MME according to the indication information transmitted by the target MME.

Alternatively, the target NodeB may transmit, without the indication of the target MME, the IP address of the LGW that the target NodeB can be connected with and/or the LHN ID of the local network that the target NodeB is located to the Target MME when the target NodeB knows the IP address of the LGW that the target NodeB can be connected with and/or the LHN ID of the local network that the target NodeB is located.

At block 307, the target MME determines according to the IP address of the LGW that the target NodeB can be connected with and/or the LHN ID of the local network where the target NodeB is located and the IP address of the LGW connected with the source NodeB and/or the LHN ID of the local network of the source NodeB:

If the current service of the handoff UE is the LIPA@LN service and if the received LHN ID of the local network of the target NodeB is the same with that of the source NodeB, the handoff procedure proceeds.

If the current service of the handoff UE is the SIPTO@LN or SIPTO@CN@LN and if the received LHN ID of the local network of the target NodeB is the same with that of the source NodeB, the handoff procedure proceeds.

If the received LHN ID of the local network of the target NodeB is not the same with that of the source NodeB, it is further required to determine according to indication of the network policy.

Suppose that the network policy indicates that the continuity of the SIPTO service should be maintained to the best capability even if the UE moves out of the local network, the MME determines whether the target NodeB can connect with the LGW connected with the source NodeB according to the IP addresses of all of the LGWs that the target NodeB can be connected with, if yes, the MME determines that the handoff can be kept on; otherwise, the handoff fails.

Alternatively, if the network policy indicates that the continuity of the SIPTO service should be maintained to the best capability even if the UE moves out of the local network, the target MME transmits indication information to the target NodeB in block 305, wherein the indication information may include the IP address of the current LGW (i.e., the LGW connected with the source NodeB). After receiving the indication information, the target NodeB may determine whether there is a connection between the target NodeB and the current LGW, and returns the LHN ID of the local network that the target NodeB is located, or the IP address of the LGW that the target NodeB can be connected with and whether the connection can be established between the target NodeB and the LGW connected with the source NodeB to the target MME in block 306. Thus in block 307, the target MME may acquire enough information to determine whether the UE has moved out of the local network. If the UE moves out of the local network, it is further determined whether the connection can be established between the target NodeB and the LGW connected with the source NodeB, if yes, the MME determines that the handoff can be kept on; otherwise, the handoff fails.

A Third Example

FIG. 4 is a schematic diagram illustrating an S1 handoff according to the third example of the present disclosure. The handoff procedure includes the following operations.

Blocks 401 to 404 are similar to those of blocks 201 to 204 and will not be repeated herein.

At block 405, the target MME performs different handoff actions with respect to different APNs, i.e., adopts different access control determination methods for the SIPTO service and the LIPA service.

At block 406, if it is determined according to the APN that the current service of the handoff UE is LIPA@LN, the target MME transmits a handoff request to the target NodeB, wherein the message carries the LHN ID of the local network where the source NodeB is located and/or the IP address of the LGW connected with the source NodeB. The target NodeB performs the access control determination. In particular, the target NodeB compares the LHN ID of the local network where the target NodeB is located with information of the source NodeB transmitted by the target MME, if the LHN ID of the local network where the target NodeB is located is the same with that of the source NodeB, it indicates that the target NodeB is located in the same local network with the source NodeB, the handoff proceeds; otherwise, it indicates that the target NodeB is not located in the same local network with the source NodeB, the handoff fails.

If it is determined according to the APN that the current service of the handoff UE is a SIPTO related service, e.g., SIPTO@LN or SIPTO@LN@CN, the MME transmits a handoff request message to the target NodeB, wherein the message carries the information similar to those in conventional handoff request message, no additional information related to the local network is required.

At block 407, if the information carried in the handoff request message received by the target NodeB in block 406 is the same with that in the prior art, the target NodeB returns a handoff request acknowledgement message to the target MME. The handoff request acknowledgement message may be the same with that in the prior art. If the target NodeB is a NodeB supporting local relative services, the target NodeB may further carry the LHN ID of the local network where the target NodeB is located or the IP address of the LGW that the target NodeB can be connected with in the handoff request acknowledgement message. The MME determines whether the handoff can be kept on according to the APN information.

If it is determined according to the APN that the current service of the handoff UE is SIPTO related service, e.g., the APN is SIPTO@LN, or SIPTO@LN@CN, the MME determines whether the LHN ID of the local network where the target NodeB is located is the same with that of the source NodeB, if not, it indicates that the UE has moved out of the local network. The MME needs to further determine whether the handoff can be kept on.

a) The target MME determines whether there is a connection between the target NodeB and the LGW connected with the source NodeB according to the IP addresses of all of the LGWs that the target NodeB can be connected with transmitted by the target NodeB.

b) Alternatively, the target MME transmits the IP address of the LGW connected with the source NodeB to the target NodeB through block 406. The target NodeB determines whether there is a connection with the IP address and transmits information about whether there is a connection with the LGW connected with the source NodeB to the target MME.

c) Alternatively, the target MME saves, for each NodeB, a corresponding relationship between the NodeB connected with the target MME and the IP address of all of the LGWs can be connected with the NodeB. The corresponding relationship may be obtained during the S1 setup procedure. Or, the NodeB transmits the IP address of all of the LGWs can be connected with the NodeB to the MME in an initial message each time the UE establishes an initial connection. In block 407, the target MME determines whether the target NodeB can access the LGW connected with the source NodeB according to the IP address of the LGW connected with the source NodeB and the ID of the target NodeB. If yes, the MME determines that the handoff can be kept on.

In the above block 407, the message may carry the IP address information of the local network where the target NodeB is located or the IP address information of the LGW that the local network can access, so as to help the MME to determine whether the UE moves out of the local network.

Furthermore, the target NodeB may further carry the IP addresses of all of the LGWs that the target NodeB can be connected with in the message, so as to help the MME to determine whether the target NodeB can have a connection with the LGW connected with the source NodeB.

Alternatively, the target NodeB may carry the capability information of the target NodeB in block 407, indicating the capability of supporting the SIPTO@LN or SIPTO@CN@LN service of the target NodeB. The MME compares the capability of the target NodeB and the APN information of the current handoff. If they match, it is determined that the handoff can be kept on. If the APN information is SIPTO relevant information, the MME performs the access control determination according to the APN information and the capability of the target NodeB or whether the target NodeB has a connection with the LGW connected with the source NodeB. The capability information of the target NodeB and the information about whether the target NodeB has a connection with the LGW connected with the source NodeB may be carried in block 407 or be obtained through saving a corresponding relationship between the NodeB and the capability information by the MME.

In the above example, the MME performs different handoff operations with respect to different kinds of APN information.

If the APN is a LIPA@LN service, the node performing the access control determination performs the access control determination according to whether the UE is moved out of the local network. If yes, the LIPA service is deactivated.

If the APN is a SIPTO service, besides determining whether the UE is moved out of the local network, the node performing the access control determination further determines whether the service continuity should be maintained according to a network policy. The node performing the access control determination needs to know whether there is a connection between the target NodeB and the LGW connected with the source NodeB or needs to whether the target NodeB has the capability of supporting the SIPTO service.

A Fourth Example

Suppose that a NodeB is disposed in the network especially for providing service for the LIPA service, a NodeB is disposed especially for providing service for the SIPTO service.

FIG. 5 is a schematic diagram illustrating setup of an S1 connection according to an example of the present disclosure. As shown in FIG. 5, the setup procedure includes the following operations.

At block 501, the NodeB transmits an S1 setup request message to the MME, wherein the message contains the ID information and the capability information of the NodeB.

The capability information may be the types of the services that the current NodeB supports, e.g., supporting LIPA service or SIPTO service or local service of SIPTO@LN. Or, the capability information may be the IP address of the LGW that the current NodeB can be connected with or the LHN ID of the local network that the current NodeB is located.

After receiving the message, the MME saves a corresponding relationship between the ID of the NodeB and the capability information of the NodeB.

At block 502, the MME returns S1 setup response to the NodeB.

A Fifth Example

FIG. 6 is a schematic diagram illustrating an S1 handoff according to the fifth example of the present disclosure. The procedure includes the following operations.

At block 601, a source NodeB transmits a handoff required message to a source MME, wherein the message carries the information of the APN and identity information of the NodeB.

At block 602, the source MME performs different access control determinations with respect to different kinds of APN information.

If the APN information corresponding to the service is LIPA@LN, the MME determines according to the saved identity information of the NodeB and the capability information of the NodeB, since the UE context information in the MME contains the IP address of the LGW connected with the source NodeB and/or the LHN ID of the local network where the source NodeB is located. If the target NodeB and the source NodeB have the same LHN ID, the MME may determine that the UE is still in the local network and the handoff proceeds. Otherwise, it is determined that the UE has moved out of the local network and the MME determines that the handoff fails.

If the APN information corresponding to the current service is SIPTO@LN or SIPTO@LN@CN, the MME first determines whether the UE is in the local network. The determination method is similar to that described above. If the UE is moved out of the local network, and if the network policy indicates that the service continuity of the SIPTO@LN or SIPTO@LN@CN service should be maintained even if the UE is moved out of the local network, the MME needs to determine whether there is a connection between the target NodeB and the LGW connected with the source NodeB. The detailed determination method includes: the MME determines the IP address of the LGW according to the ID of the target NodeB, and determines whether the IP address is the same with the IP address of the LGW connected with the source NodeB in the UE context. If the target NodeB corresponding to IP addresses of multiple LGWs, the MME determines whether there is an IP address, among the IP addresses, which is the same with the IP address of the LGW connected with the source NodeB. If there is, it indicates that there is the connection between the target NodeB and the LGW connected with the source NodeB. Furthermore, the MME determines whether the NodeB supports the SIPTO service according to the service capability corresponding to the ID of the NodeB saved by the MME, if the NodeB supports the SIPTO service, and if the service capability supported by the target NodeB is consistent with the type of the service, the handoff procedure proceeds; otherwise, the handoff fails.

Alternatively, the access control determination in block 602 may also be performed by the target MME. After the target MME receives the handoff request message, the detailed access control determination method is the same with block 602.

Blocks 604 to 605 are the same with blocks 203 to 204 in the first example.

At block 606, the target MME transmits a handoff request message to the target NodeB.

At block 607, the target NodeB returns a handoff request acknowledgement message to the target MME.

A Sixth Example

FIG. 7 is a schematic diagram illustrating a setup procedure of an X2 connection according to the sixth example of the present disclosure. The procedure includes the following operations.

At block 701, NodeB 1 transmits an X2 setup request message to NodeB 2, wherein the message contains the capability information of the NodeB 1, so as to ensure that an X2 connection can only be established between two NodeBs in the same local network or between NodeBs with the same capability.

NodeB 2 determines according to the capability information of the NodeB 1. The capability information may be information of local network that the NodeB supports, e.g., identity of the local network or IP address of the LGW of the local network. Or, the capability information may also be capability information indicating whether NodeB 1 supports LIPA service or SIPTO service. If the capability information of NodeB 1 is consistent with that of NodeB 2, NodeB 2 may return a setup succeed response message to NodeB 1; otherwise, NodeB 2 returns a setup failure response message to NodeB 1.

At block 702, NodeB 2 returns an X2 setup success message to NodeB 1.

According to the above example, it is ensured that, in the same local network, an X2 connection can only be established between two NodeBs with the same capability. Thus, if the UE moves out of the local network, S1 handoff will be executed. The detailed procedure is as shown in FIG. 2, FIG. 3, FIG. 4 and FIG. 6.

A Seventh Example

This example is a substitute solution for the X2 handoff. As shown in FIG. 8, the procedure includes the following operations.

Blocks 801 to 802 belong to a handoff preparing procedure. The source NodeB transmits a handoff request message to the target NodeB, and the target NodeB returns a handoff request acknowledgement to the source NodeB.

At block 803, the target NodeB transmits a path switch message to the MME, wherein the message contains the capability information of the target NodeB. The capability information may be the identity of the local network, where the target NodeB is located and/or the IP address of the LGW that the target NodeB can be connected with, or the capability information indicating whether the target NodeB supports the SIPTO service or LIPA service.

At block 804, the MME performs access control determination.

If the APN of the current service is LIPA@LN service, the MME determines whether the UE is moved out of the local network according to the received capability information of the target NodeB and the capability information of the source NodeB saved by the MME. If the UE moves out of the local network, the MME determines that the handoff fails.

If the APN of the current service is SIPTO@LN or SIPTO@LN@CN, the MME determines whether the UE moves out of the local network according to the capability information of the target NodeB and the capability information of the source NodeB saved by the MME. If the UE does not move out of the local network, the service is kept to be continuous; if the UE moves out of the local network, it is further required to determined according to the current network policy. If the network policy indicates that the service continuity should be maintained, it is further required to determine whether there is a connection between the target NodeB and the LGW connected with the source NodeB. The IP address of the LGW provided by the target NodeB and the IP address of the LGW in the UE context are compared. If the IP addresses of LGWs that the target NodeB can be connected with include the IP address of the LGW accessed by the source NodeB, it indicates that the target NodeB has a connection with the LGW of the source NodeB. The IP address information of the LGWs that the target NodeB can be connected with may be provided to the MME as the capability information of the target NodeB in block 803 or provided to the MME during the S1 setup procedure.

An Eighth Example

This example is a substitute solution of the seventh example.

Suppose that a NodeB is disposed in the network especially for providing service for the LIPA service or SIPTO service, or the NodeB can acquire that the current service is LIPA service or SIPTO service.

During the X2 handoff, if the current service is a LIPA related service, operations shown in FIG. 9a are executed. If the current service is SIPTO service, operations as shown in FIG. 9b are executed.

The X2 handoff procedure as shown in FIG. 9a includes the following operations.

At block 901a, the source NodeB transmits a handoff request message to the target NodeB, wherein the message contains the capability information of the source NodeB. The capability information may include one or more items of the following: identity of the local network where the source NodeB is located, the IP address of the LGW connected with the source NodeB, and the capability information indicating the services supported by the source NodeB.

At block 902a, the target NodeB performs access control determination. The target NodeB determines according to the capability information of the target NodeB and the capability information of the source NodeB. If the identity of the local network where the target NodeB is located is the same with that of the source NodeB, or if the IP address of the LGW connected with the target NodeB is the same with that of the source NodeB, or if the target NodeB has the same service capability with the source NodeB, the handoff may proceed.

At block 903a, if the handoff proceeds, the target NodeB returns a handoff request acknowledgement to the source NodeB; otherwise, the target NodeB returns a handoff failure message to the source NodeB.

The X2 handoff procedure as shown in FIG. 9b includes the following operations.

At block 901b, the source NodeB transmits a handoff request message to the target NodeB.

At block 902b, the target NodeB returns a handoff request acknowledgement to the source NodeB.

At block 903b, the target NodeB transmits a path switch message to the MME, wherein the message carries the capability information of the target NodeB. The capability information contains one or more of the following: identity of the local network where the target NodeB is located, the IP address of the LGW that the target NodeB can be connected with, capability information indicating the service supported by the target NodeB.

At block 904b, the MME performs access control determination. The MME determines according to the received capability information of the target NodeB, since the UE context information in the MME contains the service type information of the UE and the capability information of the source NodeB, e.g., the information of the local network where the source NodeB is located. The MME may determine whether the current UE has moved out of the local network. Furthermore, the MME may determine whether the target NodeB has a connection with the LGW connected with the source NodeB according to the IP address of the LGW supported by the target NodeB or the S1 setup or configuration information. The MME determines whether the handoff will succeed. Furthermore, the MME may determine whether the capability information indicating the service supported by the target NodeB is consistent with the current service, so as to determine whether the handoff will succeed.

A Ninth Example

This example describes an initial network access procedure of a UE. This procedure is also applicable for a PDN connection setup procedure or other NAS request procedures, as shown in FIG. 10.

At block 1001, an RRC setup procedure is executed.

At block 1002, the NodeB transmits an initial UE message to the MME, wherein the message carries the capability information of the NodeB. The capability information includes relevant information of the local network where the NodeB is located, e.g., the identity of the local network or the IP address of the LGW of the local network. The capability information may also include the capability information of the current NodeB, e.g., whether the current NodeB supports the LIPA service access or SIPTO service access. Service capability information and the information of the local network where the current NodeB is located may be transmitted at the same time, or only one of them may be transmitted.

At block 1003, the UE transmits an attach request message to the MME, wherein the attach request message contains the service information (APN) that the UE requests to attach. If the message does not carry such information, the MME determines that the default APN information is requested by the UE. The default APN information is obtained from subscription information.

At block 1004, the MME obtains the subscription information of the UE from the HSS. The subscription information includes the APN information that the UE can access, e.g., service labels corresponding to the APN information, e.g., the APN corresponding to the LIPA local service (LIPA@LN), or the SIPTO local service (SIPTO@LN or SIPTO@LN@CN). The MME performs access control determination according to the subscription information of the UE, service information requested by the current UE and the service capability information of the NodeB that the UE currently accesses.

If the service currently requested by the UE is SIPTO@LN, the subscription information of the UE includes running the SIPTO@LN accessed by the user and the NodeB currently accessed by the UE has the capability of supporting the SIPTO@LN, the MME allows the service request of the current UE and selects a suitable LGW for the UE.

At block 1005, the MME transmits a create session request to the SGW.

At block 1006, the SGW transmits a create session request to the LGW.

It can be seen from the above examples that, in the access control determination method provided by the examples of the present disclosure, through determining the type of the current service and whether the UE is in the same local network before and after the handoff, it can be determined, in combination of the network policy, whether the service continuity of the SIPTO service should be maintained. Thus, it is able to correctly determine under which situations the deactivation of the LIPA service or the SIPTO service should be performed, and determine under which situations the continuity of the LIPA or SIPTO service should be maintained, so as to correctly maintain the continuity of the LIPA service or the SIPTO service.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method by a mobility management entity (MME), the method comprising:
receiving, from a first base station, a first message including a first local home network (LHN) identifier (ID);
receiving, from a second base station, a second message for requesting a path switch including a second LHN ID;
determining whether to maintain a service continuity of a selected IP traffic offload (SIPTO) service based on the first LHN ID and the second LHN ID;
maintaining the service continuity of the SIPTO service, if the first LHN ID is a same as the second LHN ID; and
disconnecting the SIPTO service, if the first LHN ID is different from the second LHN ID.

2. The method of claim 1, wherein the first message comprises initial user equipment (UE) message,
the second message comprises path switch request message, and
the first message includes an address of a local gateway.

3. A method by a first base station, the method comprising:
transmitting, to a second base station, a first message for setting up an interface including a first local home network (LHN) identifier (ID);
receiving, from the second base station, a second message in response to the first message if the first LHN ID is a same as a second LHN ID of the second base station; and
transmitting, to the second base station, a third message for requesting a handover, the first LHN ID being used to determine whether to maintain a service continuity of a selected IP traffic offload (SIPTO) service,
wherein the service continuity of the SIPTO service is maintained, if the first LHN ID is same as the second LHN ID.

4. The method of claim 3,
wherein the SIPTO service is disconnected, if the first LHN ID is different from the second LHN ID.

5. The method of claim 3, wherein the third message includes an address of a local gateway.

6. A method by a second base station, the method comprising:
receiving, to a first base station, a first message for setting up interface including a first local home network (LHN) identifier (ID);
transmitting, to the first base station, a second message in response to the first message if the first LHN ID is same as a second LHN ID of the second base station;
receiving, from the first base station, a third message for requesting a handover; and
transmitting, to a mobility management entity (MME), a fourth message for requesting a path switch including the second LHN ID, the second LHN ID being used to determine whether to maintain a service continuity of a selected IP traffic offload (SIPTO) service,
wherein the service continuity of the SIPTO service is maintained, if the first LHN ID is same as the second LHN ID.

7. The method of claim 6,
wherein the SIPTO service is disconnected, if the first LHN ID is different from the second LHN ID.

8. A mobility management entity (MME), the MME comprising:
a transceiver configured to transmit and receive signals; and
a controller coupled with the transceiver and configured to:
receive, from a first base station, a first message including a first local home network (LHN) identifier (ID),
receive, from a second base station, a second message for requesting a path switch including a second LHN ID, and
determine whether to maintain a service continuity of a selected IP traffic offload (SIPTO) service based on the first LHN ID and the second LHN ID,
wherein the controller is configured to maintain the service continuity of the SIPTO service, if the first LHN ID is same as the second LHN ID, and
wherein the controller is configured to disconnect the SIPTO service, if the first LHN ID is different from the second LHN ID.

9. The MME of claim 8 wherein
the first message comprises initial user equipment (UE) message,
the second message comprises path switch request message, and
the first message includes an address of a local gateway.

10. A first base station, the first base station comprising:
a transceiver configured to transmit and receive signals; and
a controller coupled with the transceiver and configured to:
transmit, to a second base station, a first message for setting up interface including a first local home network (LHN) identifier (ID),
receive, from the second base station, a second message in response to the first message if the first LHN ID is same as a second LHN ID of the second base station, and
transmit, to the second base station, a third message for requesting a handover, the first LHN ID being used to determine whether to maintain a service continuity of a selected IP traffic offload (SIPTO) service,
wherein the service continuity of the SIPTO service is maintained, if the first LHN ID is a same as the second LHN ID.

11. The first base station of claim 10, wherein the SIPTO service is disconnected, if the first LHN ID is different from the second LHN ID.

12. The first base station of claim 10, wherein the third message includes an address of a local gateway.

13. A second base station, the second base station comprising: a transceiver configured to transmit and receive signals; and
a controller coupled with the transceiver and configured to:
receive, to a first base station, a first message for setting up interface including a first local home network (LHN) identifier (ID),
transmit, to the first base station, a second message in response to the first message if the first LHN ID is same as a second LHN ID of the second base station,
receive, from the first base station, a third message for requesting a handover, and
transmit, to a mobility management entity (MME), a fourth message for requesting path switch including the second LHN ID, the second LHN ID being used to determine whether to maintain a service continuity of a selected IP traffic offload (SIPTO) service,
wherein the service continuity of the SIPTO service is maintained, if the first LHN ID is same as the second LHN ID.

14. The second base station of claim 13, wherein the SIPTO service is disconnected, if the first LHN ID is different from the second LHN ID.

\* \* \* \* \*